United States Patent
Klein

(10) Patent No.: US 10,922,543 B2
(45) Date of Patent: Feb. 16, 2021

(54) SYSTEM AND METHOD FOR CO-REGISTERING TERRAIN DATA AND IMAGE DATA

(71) Applicant: The Boeing Company, Chicago, IL (US)

(72) Inventor: Robert J. Klein, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 61 days.

(21) Appl. No.: 16/421,305

(22) Filed: May 23, 2019

(65) Prior Publication Data

US 2020/0372237 A1  Nov. 26, 2020

(51) Int. Cl.
  *G06K 9/00* (2006.01)
  *G06K 9/62* (2006.01)

(52) U.S. Cl.
  CPC ......... *G06K 9/0063* (2013.01); *G06K 9/6202* (2013.01)

(58) Field of Classification Search
  CPC .................... G06K 9/0063; G06K 9/6202
  See application file for complete search history.

(56) References Cited

U.S. PATENT DOCUMENTS

| | | | |
|---|---|---|---|
| 2010/0329513 A1* | 12/2010 | Klefenz | G06K 9/00805 382/104 |
| 2019/0347849 A1* | 11/2019 | Chen | G06T 15/60 |

OTHER PUBLICATIONS

Brivio et al., "Automatic selection of control-points from shadow structures," Int. J. Remote Sensing, 1992, vol. 13, No. 10, 1853-1860.
Horn et al., "Using synthetic images to register real images with surface models," Communications of the ACM, Nov. 1978, vol. 21, No. 11., 914-924.
Pritt et al., "Automated cross-sensor registration, orthorectification and geopositioning using LIDAR digital elevation models," Applied Imagery Pattern Recognition Workshop (AIPR), 2010 IEEE 39th, IEEE, Oct. 13, 2020, pp. 1-6.
Extended European Search Report dated Aug. 11, 2020 in corresponding European Application No. 20175993.3 (7 pages).

* cited by examiner

*Primary Examiner* — Tuan H Nguyen
(74) *Attorney, Agent, or Firm* — MH2 Technology Law Group LLP

(57) ABSTRACT

A method for co-registering terrain data and image data includes receiving terrain data and image data. The method also includes determining a position of a light source based upon the image data. The method also includes creating a hillshade representation of the terrain data based upon the terrain data and the position of the light source. The method also includes identifying a portion of the hillshade representation and a portion of the image data that correspond to one another. The method also includes comparing the portion of the hillshade representation and the portion of the image data. The method also includes determining a vector control between the portion of the hillshade representation and the portion of the image data based upon the comparison. The method also includes applying the vector control to the image data to produce updated image data.

19 Claims, 8 Drawing Sheets

SYSTEM AND METHOD FOR CO-REGISTERING TERRAIN DATA AND IMAGE DATA

FIELD OF THE DISCLOSURE

The present disclosure is directed to systems and methods for co-registering terrain data and image data.

BACKGROUND

Terrain data and image data are different types of data that may represent a target area. As used herein, "terrain data" refers to elevation information in a gridded (e.g., image) format, with each pixel corresponding to a point on a coordinate system. For example, the point may include an X-value, a Y-value, and/or a Z-value in a Cartesian coordinate system. The terrain data may be captured by LIDAR, radar, stereo image triangulation, ground survey, or structure from motion image processing techniques.

As used herein, "image data" refers to an electro-optical image (e.g., picture) that is captured/acquired by a source such as a camera on a satellite or an aircraft. The image data may be in the visual or infrared spectrum. In a particular example, the target area may include a portion of the surface of the Earth. As will be appreciated, the portion of the surface of the earth may include varying shapes and elevations, such as mountains, trees, buildings, etc.

Terrain data and image data may each include a plurality of pixels. However, the pixels in the terrain data and image data are oftentimes misaligned. For example, a first pixel in the terrain data that corresponds to a particular point on a mountain may be misaligned with a corresponding first pixel in the image data that corresponds to the same point on the mountain. The terrain data and/or the image data may be shifted such that the first pixels are aligned; however, then a second pixel in the terrain data that corresponds to a particular point on the mountain may be misaligned with a corresponding second pixel in the image data that corresponds to the same point on the mountain. Thus, it may be difficult to align each corresponding pair of pixels. If the pixels are misaligned when the terrain data and the image data are combined to produce an image (e.g., a map), this misalignment may reduce the quality and accuracy of the image.

SUMMARY

A method for co-registering terrain data and image data is disclosed. The method includes receiving terrain data and image data. The method also includes determining a position of a light source based upon the image data. The method also includes creating a hillshade representation of the terrain data based upon the terrain data and the position of the light source. The method also includes identifying a portion of the hillshade representation and a portion of the image data that correspond to one another. The method also includes comparing the portion of the hillshade representation and the portion of the image data. The method also includes determining a vector control between the portion of the hillshade representation and the portion of the image data based upon the comparison. The method also includes applying the vector control to the image data to produce updated image data.

In another implementation, the method includes receiving terrain data and receiving image data. The image data is captured by a camera on an aircraft or a satellite. The method also includes determining a position of the sun at a time that the image data was captured based upon shadows in the image data. The position of the sun includes an azimuth and an altitude of the sun. The method also includes creating a hillshade representation of the terrain data based upon the terrain data and the position of the sun. The method also includes identifying a portion of the hillshade representation and a portion of the image data that correspond to one another. The method also includes comparing the portion of the hillshade representation and the portion of the image data using an image-matching technique, a pattern-matching technique, or an object-matching technique to output a plurality of coordinate pairs. Each coordinate pair includes a first pixel in the image data and a second pixel in the hillshade representation. The first and second pixels each correspond to a same point on a surface of the Earth. The first and second pixels are misaligned. The method also includes determining a vector control for each coordinate pair. The vector control includes a distance and a bearing from the first pixel to the second pixel. The method also includes applying the vector control to the image data to move the first pixel the distance along the bearing to become aligned with the second pixel, thereby producing updated image data.

A computing system is also disclosed. The computing system includes one or more processors and a memory system. The memory system includes one or more non-transitory computer-readable media storing instructions that, when executed by at least one of the one or more processors, cause the computing system to perform operations. The operations include receiving terrain data and receiving image data. The image data is captured by a camera on an aircraft or a satellite. The operations also include determining a position of the sun at a time that the image data was captured based upon shadows in the image data. The position of the sun includes an azimuth and an altitude of the sun. The operations also include creating a hillshade representation of the terrain data based upon the terrain data and the position of the sun. The operations also include identifying a portion of the hillshade representation and a portion of the image data that correspond to one another. The operations also include comparing the portion of the hillshade representation and the portion of the image data using an image-matching technique, a pattern-matching technique, or an object-matching technique to output a plurality of coordinate pairs. Each coordinate pair includes a first pixel in the image data and a second pixel in the hillshade representation. The first and second pixels each correspond to a same point on a surface of the Earth. The first and second pixels are misaligned. The operations also include determining a vector control for each coordinate pair. The vector control includes a distance and a bearing from the first pixel to the second pixel. The operations also include applying the vector control to the image data to move the first pixel the distance along the bearing to become aligned with the second pixel, thereby producing updated image data.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
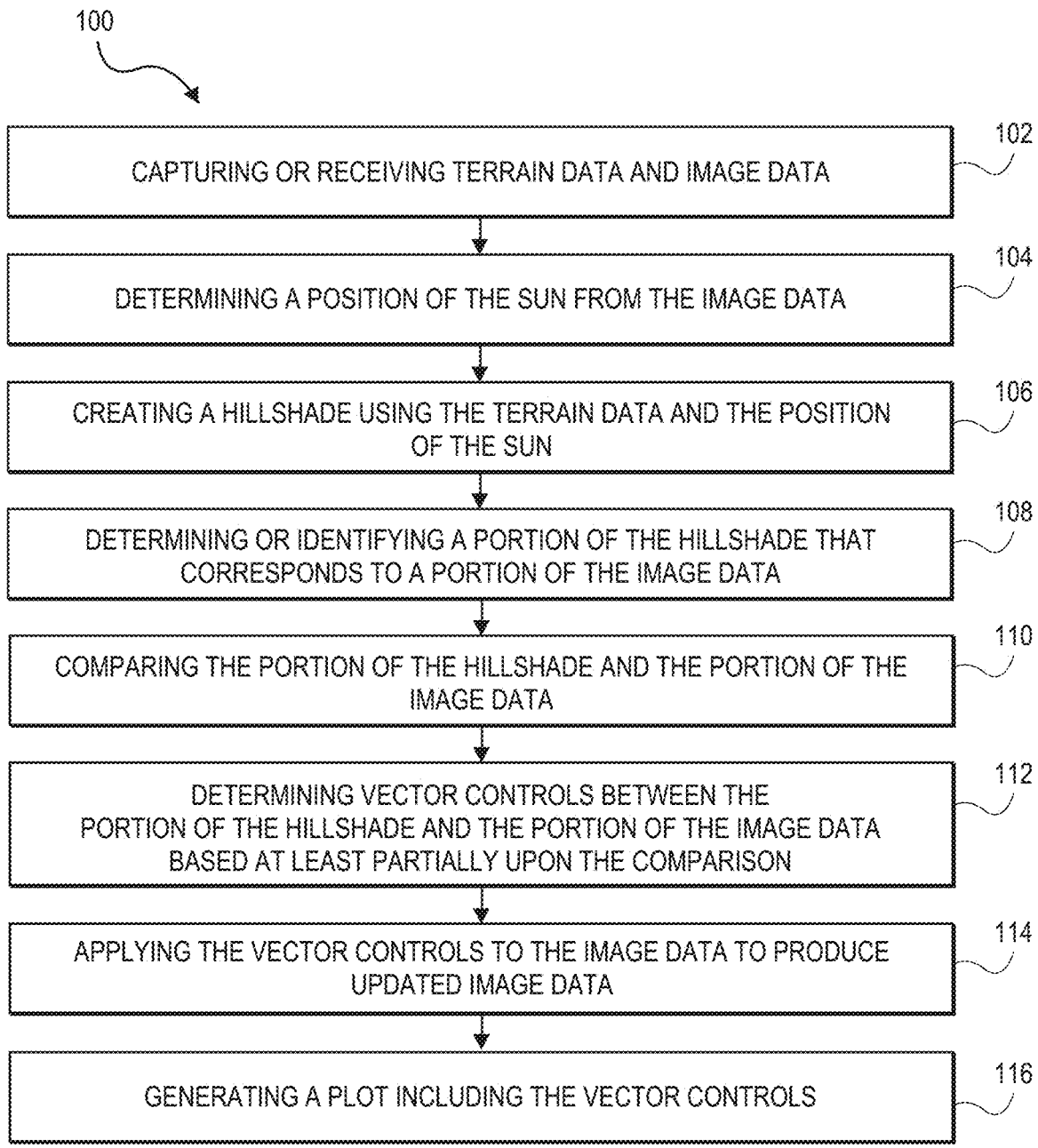
FIG. 1 illustrates a flowchart of a method for co-registering terrain data and image data, according to an implementation.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

Figure 2A:
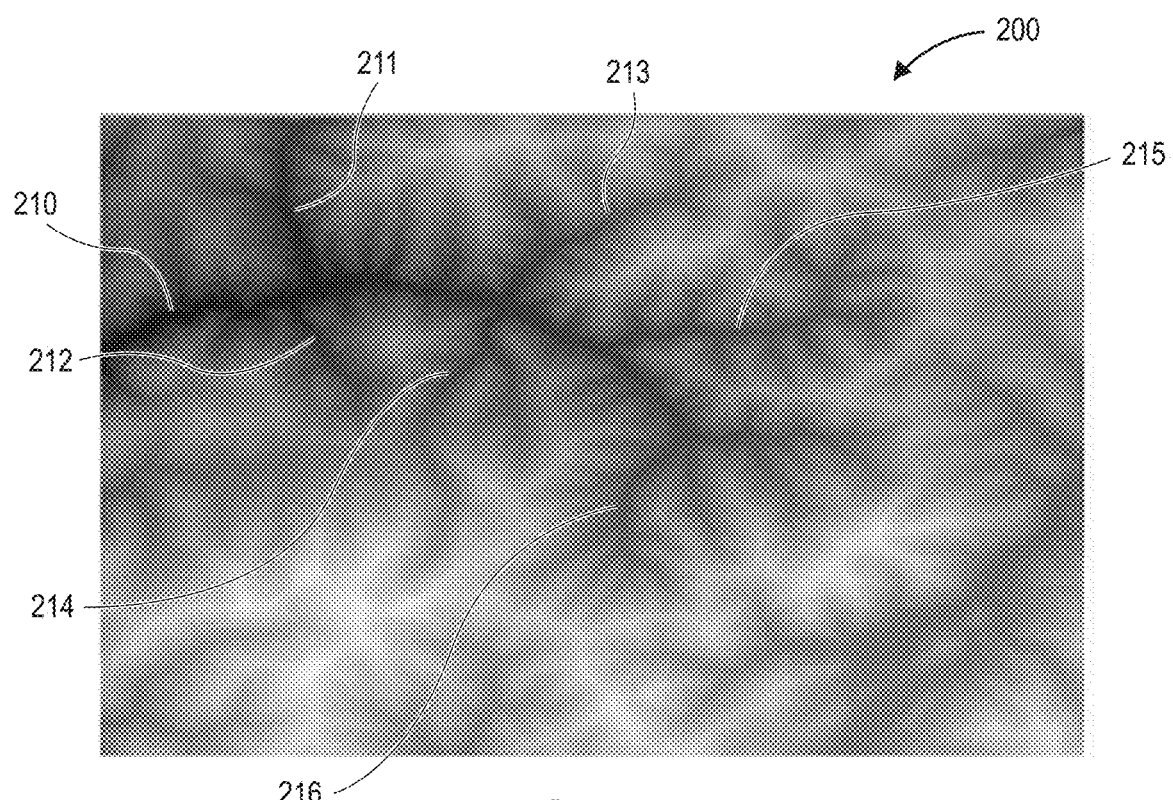
FIG. 2A illustrates an example of terrain data, according to an implementation.
Figure 2B:
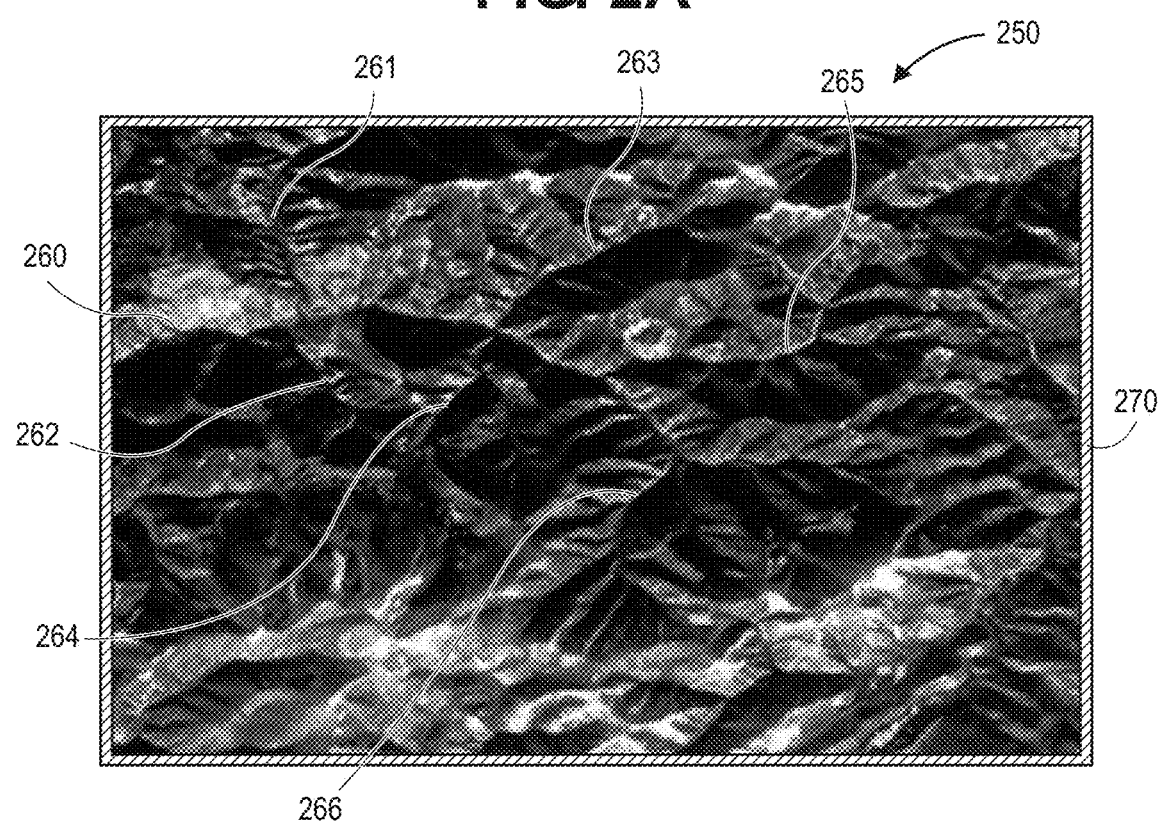
FIG. 2B illustrates an example of image data, according to an implementation.

FIG. 1 illustrates a flowchart of a method 100 for co-registering terrain data and image data, according to an implementation. As used herein, "co-registering" refers to making the pixels in two images (e.g., the terrain data and the image data) align or match. The method 100 may include capturing or receiving terrain data and image data, as at 102. FIG. 2A illustrates an example of terrain data 200, and FIG. 2B illustrates an example of image data 250, according to an implementation. The terrain data 200 and the image data 250 may both represent the same target area. For example, the terrain data 200 and the image data 250 may both represent the same portion of the surface of the Earth. As shown, the area represented in the terrain data 200 and the image data 250 is mountainous. In the particular example shown, the terrain data 200 includes a ridge 210 with one or more arms 211-216, and the image data 250 also includes the same ridge 260 with the one or more arms 261-266.

Figure 3:
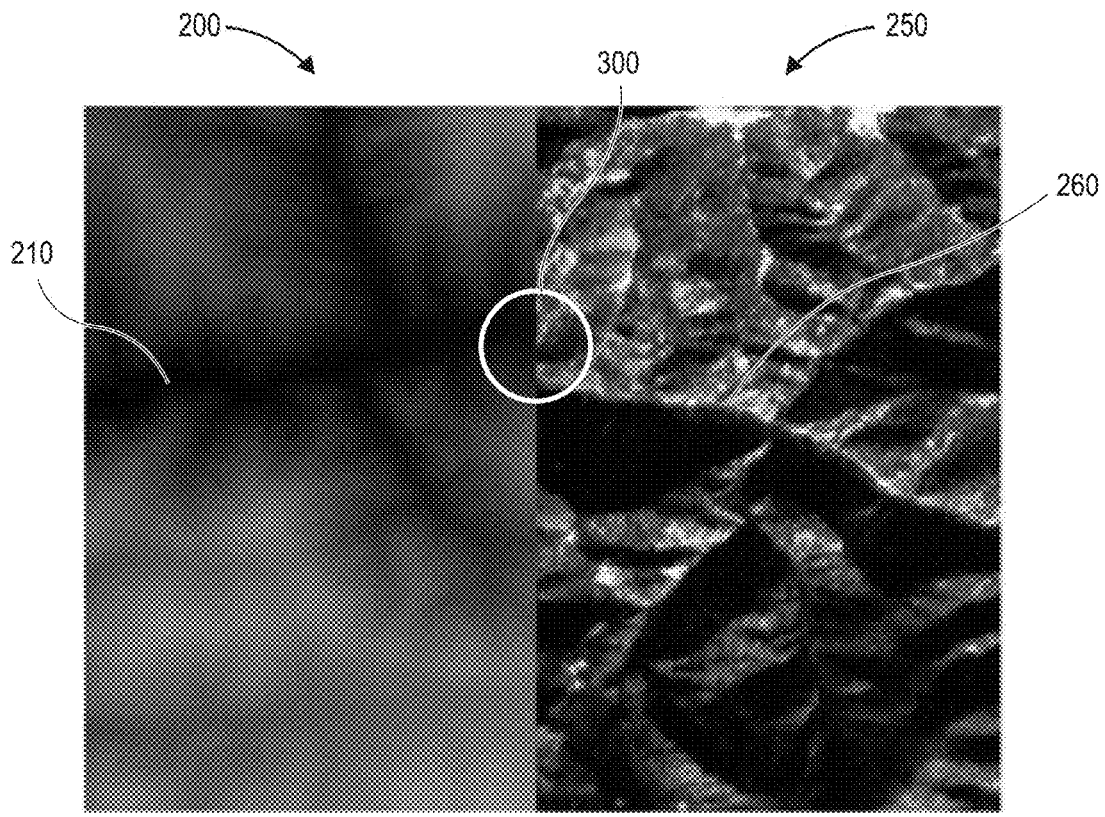
FIG. 3 illustrates the terrain data side-by-side with (i.e., compared to) the image data, according to an implementation.

FIG. 3 illustrates the terrain data 200 side-by-side with (i.e., compared to) the image data 250, according to an implementation. As shown, there may be a misalignment 300 between the terrain data 200 and the image data 250. In this example, the misalignment 300 of the ridge 210 in the terrain data 200 and the ridge 260 in the image data 250 may be about 800 meters. The misalignment 300 may have a negative impact on the look and accuracy of an orthoimage generated using the terrain data 200 and the image data 250. The negative impact on the look and accuracy of the orthoimage may in turn have a negative impact on any spatial data derived from the orthoimage source. In other words, an orthoimage may be created by correcting the image data 250 to the terrain data 200, or vice versa. The actual quality of the orthoimage, outside of spatial corrections, may not yet be assessed and may depend upon the transform that is used to warp the image once vector controls have been created, as discussed below. An orthoimage, also referred to as an orthophoto, is a remotely sensed image, such as an aerial or satellite photo, that has been corrected to remove distortions caused by topographic relief (e.g., terrain) and collection parameters (e.g., sensor lens distortion, collection obliquity). Orthoimages preserve scale, allowing for accurate distance measurement.

Returning to FIG. 1, the method 100 may also include determining a position of a light source (e.g., the sun) from the image data 250, as at 104. More particularly, this may include determining a sun azimuth, a sun altitude (also referred to as a sun elevation), a sun zenith, or a combination thereof based at least partially upon metadata of the image data 250.

Figure 4:
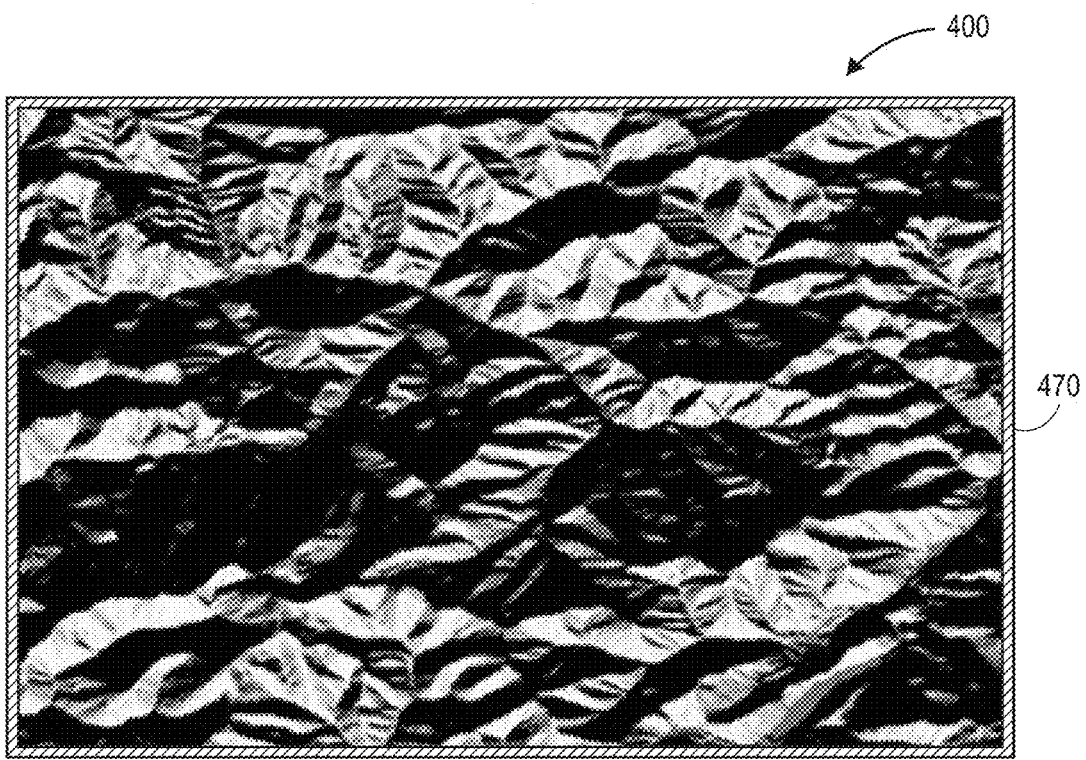
FIG. 4 illustrates a hillshade representation of the terrain data, according to an implementation.

The method 100 may also include creating a hillshade using the terrain data 200 and the position of the sun, as at 106. FIG. 4 illustrates a hillshade 400 created using the terrain data 200 and the position of the sun, according to an implementation. The hillshade 400 is a two-dimensional (2D) or three-dimensional (3D) representation of the terrain data 200 that takes the position of the sun into account for shadows and shading. More particularly, the hillshade 400 simulates the determined position of the sun to create shadows and shading, which adds a relief-like look to the terrain data 200. To match the terrain data 200 to the image data 250 as closely as possible, the sun azimuth, sun altitude, and/or sun zenith may be used to create the hillshade 400.

Figure 5A:
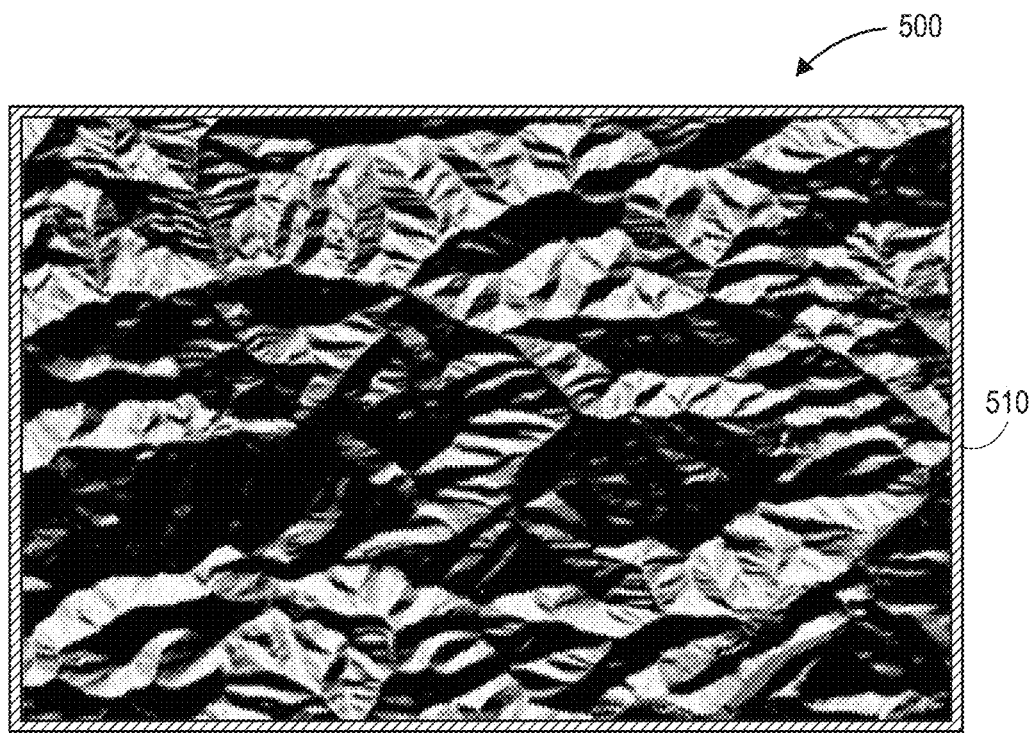
FIG. 5A illustrates a portion of the hillshade representation.
Figure 5B:
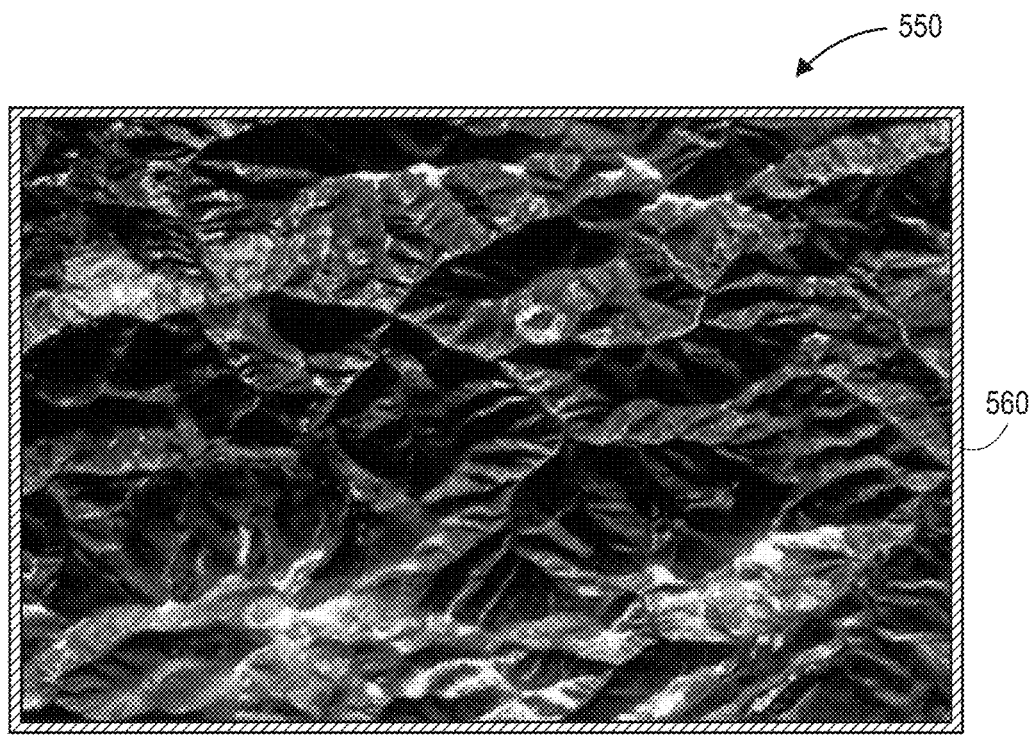
FIG. 5B illustrates a corresponding (e.g., overlapping) portion of the image data, according to an implementation.

Returning to FIG. 1, the method 100 may also include determining or identifying a portion of the hillshade 400 that corresponds to a portion of the image data 250, as at 108. FIG. 5A illustrates a portion 500 of the hillshade 400, and FIG. 5B illustrates a corresponding (e.g., overlapping) portion 550 of the image data 250, according to an implementation. Determining the portion 500 of the hillshade 400 that corresponds to the portion 550 of the image data 250 may first include placing bounding coordinates (e.g., a border) 470 around the hillshade 400 (see FIG. 4) and bounding coordinates 270 around the image data 250 (see FIG. 2B).

Then, a portion 500 of the hillshade 400 (e.g., inside the bounding coordinates 470) and a portion 550 of the image data 250 (e.g., inside the bounding coordinates 270) are determined/identified that correspond to (e.g., overlap with) one another. This may be performed by calculating a spatial overlap, also known as clipping. In at least one implementation, even though the portions 500, 550 overlap, one or more of the pixels in the portion 500 of the hillshade 400 may be misaligned with one or more pixels in the portion 550 of the image data 250.

Then, bounding coordinates 510 may be placed around the portion 500 of the hillshade 400, as shown in FIG. 5A, and bounding coordinates 560 may be placed around the portion 550 of the image data 250, as shown in FIG. 5B. The remainder of the hillshade 400, between the bounding coordinates 510 (in FIG. 5A) and the bounding coordinates 470 (in FIG. 4) may be removed and discarded. Similarly, the remainder of the image data 250, between the bounding coordinates 560 (in FIG. 5B) and the bounding coordinates 270 (in FIG. 2B) may be removed and discarded.

Figure 6:
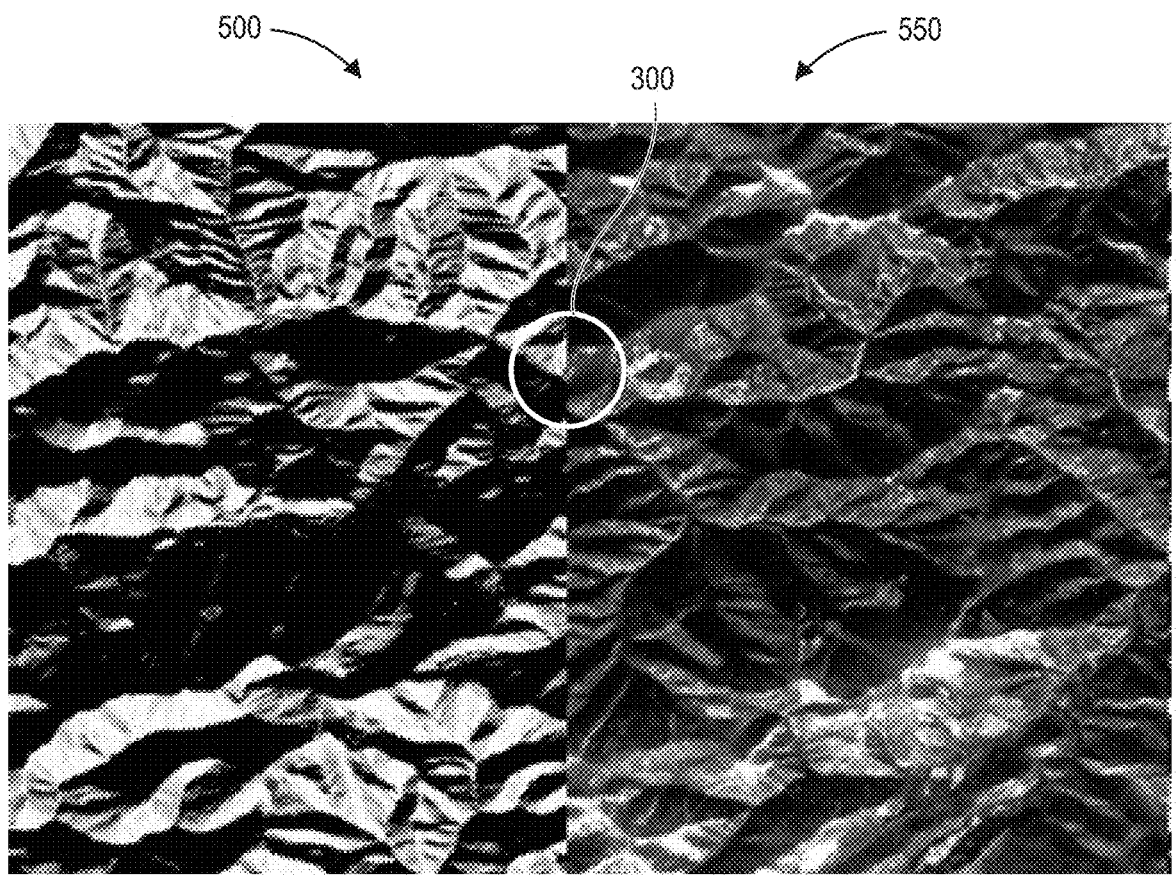
FIG. 6 illustrates the portion of the hillshade side-by-side with (i.e., compared to) the portion of the image data, according to an implementation.

Returning to FIG. 1, the method 100 may also include comparing the portion 500 of the hillshade 400 and the portion 550 of the image data 250, as at 110. FIG. 6 illustrates the portion 500 of the hillshade 400 side-by-side with (i.e., compared to) the portion 550 of the image data 250, according to an implementation. FIG. 6 is similar to FIG. 3, except that the terrain data 200 has been replace with the hillshade 400. Thus, FIG. 6 may show the misalignment 300 more clearly than FIG. 3. The comparison of the portion 500 of the hillshade 400 to the portion 550 of the image data 250 (or the portion 550 of the image data 250 to the portion 500 of the hillshade 400) may be performed using an image-matching technique, a pattern-matching technique, or an object-matching technique.

The matching technique may output one or more coordinate pairs. As used herein, a coordinate pair refers to a first coordinate in the portion 500 of the hillshade 400 and a second coordinate in the portion 550 of the image data 250. The first and second coordinates may each correspond to the same 2D or 3D point of the target area (e.g., the same point on the surface of the Earth). The coordinate pairs may be in geographic space or image space. If the coordinate pairs are in image space (e.g., image coordinates), they may be converted to geographic coordinates. In one example, the coordinate pairs may be or include arrows (e.g., from the first coordinate to the second coordinate, or vice versa).

The method 100 may also include determining vector controls between the portion 500 of the hillshade 400 and the portion 550 of the image data 250 based at least partially upon the comparison, as at 112. The vector controls may represent the distance and/or direction (i.e., bearing) between the first and second coordinates in each coordinate pair. For example, a first vector control may represent the distance and direction from a coordinate in the portion 500 of the hillshade 400 to a corresponding coordinate in the portion 550 of the image data 250. The vector controls may be created using GeoGPM.

Table 1 below represents some of the coordinates in FIGS. 5A and 5B that are used to determine the vector controls. In Table 1:

Start Image X and Y: refer to an X coordinate and a Y coordinate of a point in the starting image (e.g., FIG. 5A). For example, a start image X, Y of 200, 200 refers to a point in the starting image that is 200 pixels/columns from the left side and 200 pixels/rows from the top.

Target Image X and Y: refer to an X coordinate and a Y coordinate of a corresponding point in the target image (e.g., FIG. 5B). For example, the point that is located at 200, 200 in the starting image is located at 213, 198 in the target image. In other words, if FIGS. 5A and 5B are overlapping, the point in FIG. 5A is misaligned with the corresponding point in FIG. 5B. Thus, the vector control for these coordinates may indicate that the point in the starting image should be moved 13 columns/pixels to the right and 2 rows/pixels down to become aligned with the point in the target image. Start Image X and Y and Target Image X and Y are in image space.

Start Geo X and Y: refers to the same thing as Start Image X and Y, but in geographic space, as opposed to image space.

Target Geo X and Y refers to the same thing as Target Image X and Y, but in geographic space, as opposed to image space.

TABLE 1

| Start Image X | Start Image Y | Target Image X | Target Image Y | Start Geo X | Start Geo Y | Target Geo X | Target Geo Y |
|---|---|---|---|---|---|---|---|
| 200 | 200 | 213 | 198 | 138.515 | −34.935 | 138.515 | −34.935 |
| 400 | 200 | 413 | 198 | 138.516 | −34.935 | 138.517 | −34.935 |
| 600 | 200 | 613 | 199 | 138.518 | −34.935 | 138.518 | −34.935 |
| 800 | 200 | 813 | 198 | 138.519 | −34.935 | 138.520 | −34.935 |
| 1000 | 200 | 1013 | 199 | 138.521 | −34.935 | 138.521 | −34.935 |
| 1200 | 200 | 1213 | 198 | 138.522 | −34.935 | 138.522 | −34.935 |
| 1400 | 200 | 1412 | 199 | 138.524 | −34.935 | 138.524 | −34.935 |
| 1600 | 200 | 1612 | 199 | 138.525 | −34.935 | 138.525 | −34.935 |
| 2000 | 200 | 2012 | 198 | 138.528 | −34.935 | 138.528 | −34.935 |
| 2200 | 200 | 2212 | 198 | 138.530 | −34.935 | 138.530 | −34.935 |
| 2600 | 200 | 2612 | 199 | 138.533 | −34.935 | 138.533 | −34.935 |
| 2800 | 200 | 2812 | 199 | 138.534 | −34.935 | 138.534 | −34.935 |
| 3000 | 200 | 3012 | 199 | 138.536 | −34.935 | 138.536 | −34.935 |
| 3200 | 200 | 3213 | 198 | 138.537 | −34.935 | 138.537 | −34.935 |
| 3400 | 200 | 3413 | 198 | 138.538 | −34.935 | 138.539 | −34.935 |
| 3600 | 200 | 3613 | 199 | 138.540 | −34.935 | 138.540 | −34.935 |
| 3800 | 200 | 3813 | 199 | 138.541 | −34.935 | 138.542 | −34.935 |
| 4000 | 200 | 4013 | 199 | 138.543 | −34.935 | 138.543 | −34.935 |
| 200 | 400 | 213 | 398 | 138.515 | −34.937 | 138.515 | −34.937 |
| 400 | 400 | 413 | 398 | 138.516 | −34.937 | 138.517 | −34.937 |

Figure 7:
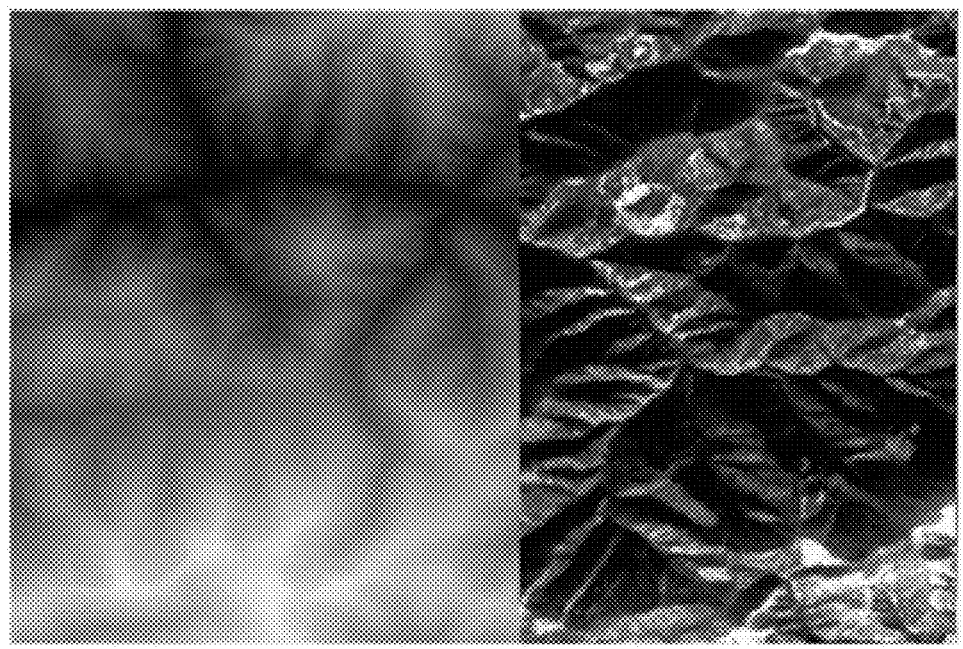
FIG. 7 illustrates the terrain data (from FIG. 2A) side-by-side with (i.e., compared to) updated image data, according to an implementation.
Figure 8:
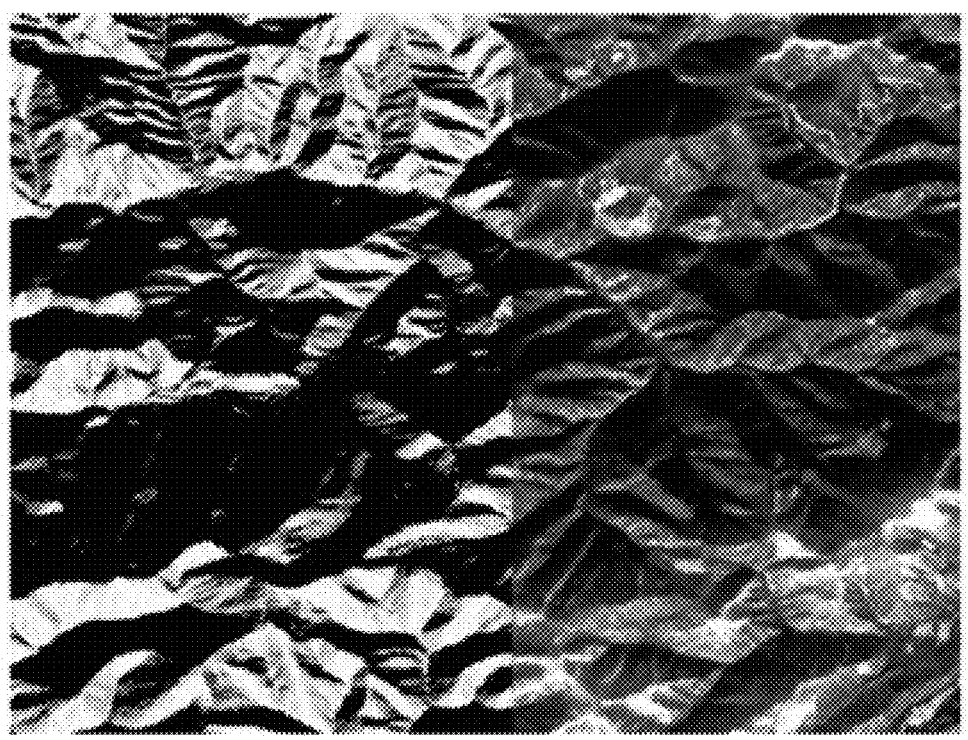
FIG. 8 illustrates the hillshade representation (from FIG. 4) side-by-side with (i.e., compared to) the updated image data, according to an implementation.

The method 100 may also include applying the vector controls to the image data 250 to produce updated image data, as at 114. FIG. 7 illustrates the terrain data 200 side-by-side with (i.e., compared to) the updated image data 700, according to an implementation. FIG. 8 illustrates the hillshade 400 side-by-side with (i.e., compared to) the updated image data 700, according to an implementation. The updated image data 700 may be used to produce a map. Instead of, or in addition to, applying the vector controls to the image data 250, the vector controls may be applied to the terrain data 200 to produce updated terrain data (or an updated hillshade 400).

Applying the vector controls may co-register (and/or geo-register) the terrain data 200 and/or the image data 250, which may reduce or eliminate the misalignment 300 seen in FIGS. 3 and 6. As used herein, geo-register" refers to making the pixels in a control image (e.g., the terrain data or the image data) align or match with the correct location/position on the surface of the Earth. In other words, applying the vector controls may transform different sets of data (e.g., the terrain data 200 and the image data 250) into a single, common coordinate system where the pixels are aligned to correlated locations in image space and/or geographic space. For example, the image data 250 can be adjusted to the terrain data 200 (or hillshade 400) using the vector controls, or the terrain data 200 (or hillshade 400) can be adjusted to the image data 250 using the vector controls. The vector controls may be applied using a transform to align the pixels. The transform may be or include a polynomial transform. The transform may be $1^{st}$ order, $2^{nd}$ order, $3^{rd}$ order, $4^{th}$ order, $5^{th}$ order, or higher. Instead of, or in addition to, using a transform, the vector controls may be applied using a warp to align the pixels.

Figure 9:
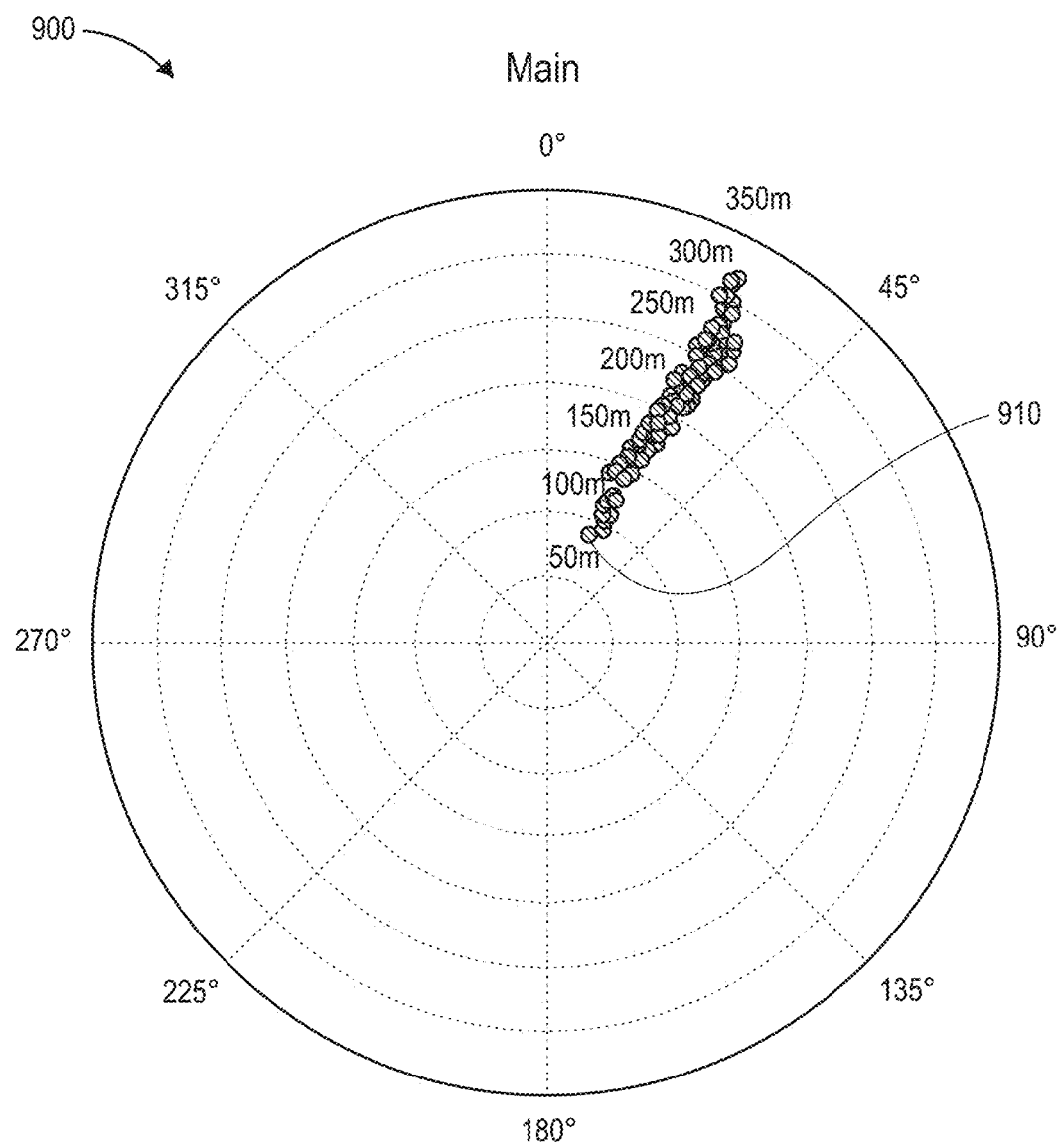
FIG. 9 illustrates a plot of vector control values used to generate the updated image data, according to an implementation.

The method 100 may also include generating a plot including the vector controls, as at 116. FIG. 9 illustrates a plot 900 including the distance and bearing values for each vector control, according to an implementation. For example, each dot (e.g., dot 910) in the plot 900 represents a distance and a bearing from a coordinate in FIG. 5A to a corresponding coordinate in FIG. 5B (or from a coordinate in FIG. 5B to a corresponding coordinate in FIG. 5A). As described above, the coordinates in FIGS. 5A and 5B may each correspond to the same point (e.g., 2D or 3D coordinate) on the surface of the Earth. Thus, the dots in the plot 900 may represent the misalignment between FIGS. 5A and 5B. The distance and bearing values may be plotted to represent statistics such as a circular error probability (CEP) of 90% (referred to as CEP90), average bearing, and differentials.

The plurality of dots (e.g., including dot 910) in the plot 900 provide the following exemplary statistics when comparing the coordinates in FIGS. 5A and 5B:

CE90: 259.8 meters
Average bearing: 26.8 degrees
Bearing range: 19.1-32.7 degrees
Distance range: 89.1-317.1 meters
Bearing differential: 13.6 degrees
Distance differential: 228.0 meters Although the plot 900 shows the CEP of the portion 550 of the image data 250 compared to the portion 500 of the hillshade 400, in other implementations, the plot 900 may how the CEP of the image to image, image to terrain, terrain to image, and/or terrain to terrain. In addition, the plot 900 may illustrate data that may enable a user to quickly see the type of shift between the sources (e.g., the terrain data 200 and the image data 250). For example, if the dots are clustered in a single quadrant, this may indicate a shift (e.g., misalignment) between the sources. However, if the dots are distributed across multiple quadrants of the plot 900, this may indicate a scale and/or rotation issue.

At least a portion of the method 100 is not a mental process and cannot be performed in the human mind. For example, in one implementation, one or more (e.g., all) of the steps are performed by a computing system, such as the one described below.

Figure 10:
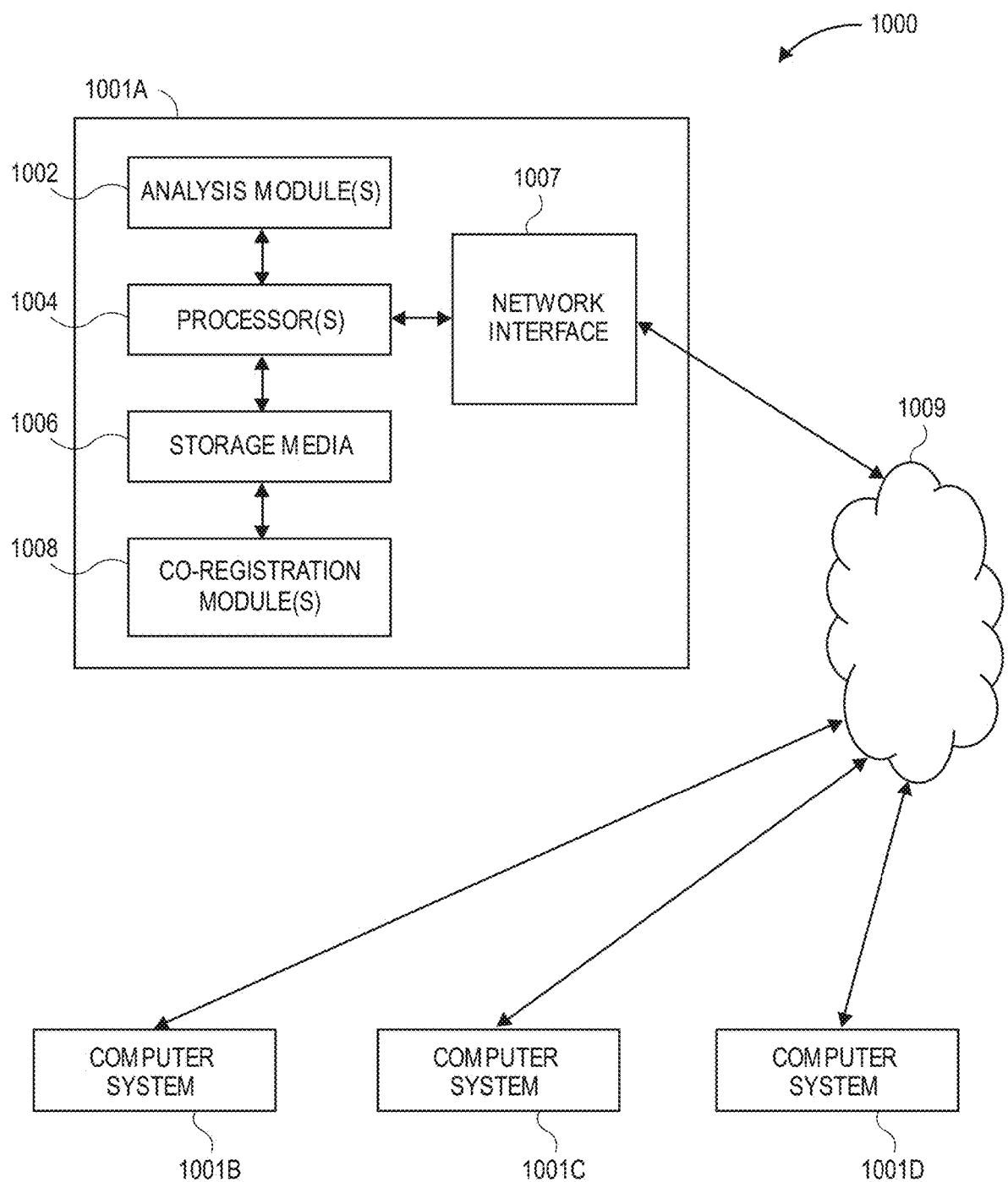
FIG. 10 illustrates a schematic view of a computing system for performing at least a portion of the method, according to an implementation.

FIG. 10 illustrates a schematic view of a computing system 1000 for performing at least a portion of the method 100, according to an implementation. The computing system 1000 may include a computer or computer system 1001A, which may be an individual computer system 1001A or an arrangement of distributed computer systems. The computer system 1001A includes one or more analysis module(s) 1002 configured to perform various tasks according to some implementations, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor can include a microprocessor, microcontroller, processor module or subsystem, programmable integrated circuit, programmable gate array, or another control or computing device.

The storage media 1006 can be implemented as one or more computer-readable or machine-readable storage media. Note that while in the example implementation of FIG. 10 storage media 1006 is depicted as within computer system 1001A, in some implementations, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some implementations, computing system 1000 contains one or more co-registration module(s) 1008 that may perform at least a portion of the method 100 described above. It should be appreciated that computing system 1000 is only one example of a computing system, and that computing system 1000 may have more or fewer components than shown, may combine additional components not depicted in the example implementation of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method for co-registering terrain data and image data, comprising:
    receiving terrain data and image data;
    determining a position of a light source based upon the image data;
    creating a hillshade representation of the terrain data based upon the terrain data and the position of the light source;
    identifying a portion of the hillshade representation and a portion of the image data that correspond to one another;
    comparing the portion of the hillshade representation and the portion of the image data which outputs a first pixel in the hillshade representation and a second pixel in the image data that correspond to a same point on a surface of the Earth;
    determining a vector control between the portion of the hillshade representation and the portion of the image data based upon the comparison; and
    applying the vector control to the image data to produce updated image data.

2. The method of claim 1, wherein the light source is the sun, which is casting shadows in the image data.

3. The method of claim 2, wherein the position of the light source comprises a sun azimuth, a sun altitude, a sun zenith, or a combination thereof.

4. The method of claim 1, wherein comparing the portion of the hillshade representation and the portion of the image data is performed using an image-matching technique that outputs a coordinate pair, wherein the coordinate pair comprises the first pixel and the second pixel.

5. The method of claim 4, wherein the coordinate pair is in image space, and further comprising converting the coordinate pair into geographic space.

6. The method of claim 4, wherein the first and second pixels are misaligned.

7. The method of claim 6, wherein the vector control comprises:
    a distance between the first pixel and the second pixel; and
    a bearing from the first pixel to the second pixel.

8. The method of claim 7, wherein applying the vector control comprises moving the first pixel the distance along the bearing to become aligned with the second pixel.

9. The method of claim 8, further comprising generating a plot to show the distance and the bearing.

10. A method for co-registering terrain data and image data, comprising:
    receiving terrain data;
    receiving image data, wherein the image data is captured by a camera on an aircraft or a satellite;
    determining a position of the sun at a time that the image data was captured based upon shadows in the image data, wherein the position of the sun comprises an azimuth and an altitude of the sun;
    creating a hillshade representation of the terrain data based upon the terrain data and the position of the sun;
    identifying a portion of the hillshade representation and a portion of the image data that correspond to one another;
    comparing the portion of the hillshade representation and the portion of the image data using an image-matching technique, a pattern-matching technique, or an object-matching technique to output a plurality of coordinate pairs, wherein each coordinate pair comprises a first pixel in the image data and a second pixel in the hillshade representation, wherein the first and second pixels each correspond to a same point on a surface of the Earth, and wherein the first and second pixels are misaligned;
    determining a vector control for each coordinate pair, wherein the vector control comprises a distance and a bearing from the first pixel to the second pixel; and
    applying the vector control to the image data to move the first pixel the distance along the bearing to become aligned with the second pixel, thereby producing updated image data.

11. The method of claim 10, further comprising generating a plot to show the distance and the bearing for each vector control.

12. The method of claim 11, determining a circular error probability of the vector controls based at least partially upon the plot.

13. The method of claim 11, wherein the terrain data is captured by a source, and further comprising determining that the source and the camera are misaligned based at least partially upon the vector controls being located in a same quadrant of the plot.

14. The method of claim 11, wherein the terrain data is captured by a source, and further comprising determining that a scale of the source is not equivalent to a scale of the camera, a rotation angle of the source is not equivalent to a rotation angle of the camera, or both, based at least partially upon the vector controls being located in at least two different quadrants of the plot.

15. A computing system comprising:
one or more processors; and
a memory system comprising one or more non-transitory computer-readable media storing instructions that, when executed by at least one of the one or more processors, cause the computing system to perform operations, the operations comprising:
receiving terrain data;
receiving image data, wherein the image data is captured by a camera on an aircraft or a satellite;
determining a position of the sun at a time that the image data was captured based upon shadows in the image data, wherein the position of the sun comprises an azimuth and an altitude of the sun;
creating a hillshade representation of the terrain data based upon the terrain data and the position of the sun;
identifying a portion of the hillshade representation and a portion of the image data that correspond to one another;
comparing the portion of the hillshade representation and the portion of the image data using an image-matching technique, a pattern-matching technique, or an object-matching technique to output a plurality of coordinate pairs, wherein each coordinate pair comprises a first pixel in the image data and a second pixel in the hillshade representation, wherein the first and second pixels each correspond to a same point on a surface of the Earth, and wherein the first and second pixels are misaligned;
determining a vector control for each coordinate pair, wherein the vector control comprises a distance and a bearing from the first pixel to the second pixel; and
applying the vector control to the image data to move the first pixel the distance along the bearing to become aligned with the second pixel, thereby producing updated image data.

16. The computing system of claim 15, wherein the operations further comprise generating a plot to show the distance and the bearing for each vector control.

17. The computing system of claim 16, wherein the operations further comprise determining a circular error probability of the vector controls based at least partially upon the plot.

18. The computing system of claim 16, wherein the terrain data is captured by a source, and further comprising determining that the source and the camera are misaligned based at least partially upon the vector controls being located in a same quadrant of the plot.

19. The computing system of claim 16, wherein the terrain data is captured by a source, and further comprising determining that a scale of the source is not equivalent to a scale of the camera, a rotation angle of the source is not equivalent to a rotation angle of the camera, or both, based at least partially upon the vector controls being located in at least two different quadrants of the plot.

* * * * *